US010136318B1

(12) United States Patent
Hancock et al.

(10) Patent No.: US 10,136,318 B1
(45) Date of Patent: Nov. 20, 2018

(54) AUTHENTICATION DEVICE SELECTION TO FACILITATE AUTHENTICATION VIA AN UPDATEABLE SUBSCRIBER IDENTIFIER

(71) Applicant: AT&T INTELLECTUAL PROPERTY I, L.P., Atlanta, GA (US)

(72) Inventors: Paul R. Hancock, Tower Lakes, IL (US); Stuart Steele, Austin, TX (US); Shanker Bhat Mangalore, Austin, TX (US); Manjunath Pandeshwar Krishna, Karnataka (IN)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/628,883

(22) Filed: Jun. 21, 2017

(51) Int. Cl.
*H04W 40/02* (2009.01)
*H04W 60/00* (2009.01)
(Continued)

(52) U.S. Cl.
CPC ......... *H04W 12/06* (2013.01); *H04L 63/0876* (2013.01); *H04L 63/0892* (2013.01)

(58) Field of Classification Search
CPC ........ H04W 8/183; H04W 40/02; H04W 6/00
(Continued)

(56) References Cited

U.S. PATENT DOCUMENTS 6,157,829 A 12/2000 Grube et al.
7,289,805 B2 10/2007 Tom et al.
(Continued)

FOREIGN PATENT DOCUMENTS

CN 101720086 B 12/2011
CN 101959183 B 1/2013
(Continued)

OTHER PUBLICATIONS

Sher et al., "3G-WLAN Convergence: Vulnerability, Attacks Possibilities and Security Model," Second International Conference on Availability, Reliability and Security (ARES'07), 2007, IEEE, 8 pages.

(Continued)

*Primary Examiner* — William D Cumming
(74) *Attorney, Agent, or Firm* — Amin, Turocy & Watson, LLP

(57) ABSTRACT

Steering an authentication request to a determined authentication device based on a correlation between a user equipment (UE) identity and an authentication device is disclosed. The authentication request comprises an updateable subscriber identity. The authentication request can be associated with the UE identity, which can be correlated to an authentication device as a result of a prior authentication event. The updateable subscriber identity can have been updated during the prior authentication event, such that the authentication device has record of the updated subscriber identity. Therefore, the authentication device can to perform an authentication based on the updated subscriber identity while other authentication devices lacking record of the updated subscriber identity would be unable to perform the authentication. The disclosed subject matter can be operable with existing deployed authentication systems with little to no modification of those systems.

20 Claims, 10 Drawing Sheets

(51) Int. Cl.
*H04W 12/06* (2009.01)
*H04L 29/06* (2006.01)

(58) Field of Classification Search
USPC ............... 455/410, 411, 419, 435.2, 445
See application file for complete search history.

(56) References Cited

U.S. PATENT DOCUMENTS

| | | | |
|---|---|---|---|
| 7,738,922 B2 | 6/2010 | Hashimoto et al. | |
| 7,770,204 B2 | 8/2010 | Pathakis et al. | |
| 8,145,212 B2 | 3/2012 | Lopresti et al. | |
| 8,234,694 B2 | 7/2012 | Youn et al. | |
| 8,245,039 B2 | 8/2012 | Jones | |
| 8,385,889 B2 | 2/2013 | Ishikawa | |
| 8,462,742 B2 | 6/2013 | Song et al. | |
| 8,463,258 B2 | 6/2013 | Parsons et al. | |
| 8,483,166 B2 | 7/2013 | Guo | |
| 9,015,815 B2 | 4/2015 | Frelechoux | |
| 9,020,467 B2 | 4/2015 | Zhang et al. | |
| 9,178,880 B1* | 11/2015 | Dotan | H04L 63/0876 |
| 9,191,374 B1* | 11/2015 | Kim | H04L 12/2834 |
| 9,398,440 B2 | 7/2016 | Paz et al. | |
| 9,412,278 B1* | 8/2016 | Gong | H04L 63/101 |
| 9,549,322 B2* | 1/2017 | Badenhorst | H04W 12/06 |
| 9,591,560 B2 | 3/2017 | Kotecha | |
| 9,614,848 B2* | 4/2017 | Yeleswarapu | H04L 63/10 |
| 9,686,675 B2 | 6/2017 | Ketheesan et al. | |
| 9,699,170 B2* | 7/2017 | Sondhi | H04L 63/08 |
| 9,749,979 B2* | 8/2017 | Puusaari | H04L 63/08 |
| 9,792,613 B2* | 10/2017 | Gong | H04L 63/101 |
| 9,805,372 B2* | 10/2017 | Gong | H04L 63/101 |
| 9,805,607 B2* | 10/2017 | Gong | H04L 63/101 |
| 9,860,234 B2* | 1/2018 | Sondhi | H04L 63/0807 |
| 9,870,566 B2* | 1/2018 | Gong | H04L 63/101 |
| 2004/0193891 A1 | 9/2004 | Ollila | |
| 2005/0081045 A1* | 4/2005 | Nicodemus | H04L 9/3271 713/182 |
| 2006/0064493 A1* | 3/2006 | Hammell | G06F 21/41 709/227 |
| 2010/0041402 A1 | 2/2010 | Gallagher et al. | |
| 2011/0098030 A1* | 4/2011 | Luoma | H04M 3/42153 455/419 |
| 2011/0117881 A1* | 5/2011 | Luoma | H04L 63/08 455/410 |
| 2011/0239281 A1* | 9/2011 | Sovio | H04L 63/0815 726/5 |
| 2011/0239282 A1* | 9/2011 | Svarfvar | H04L 63/0815 726/5 |
| 2011/0268022 A1* | 11/2011 | Xu | H04Q 3/0025 370/328 |
| 2011/0269422 A1* | 11/2011 | Xu | H04W 4/24 455/411 |
| 2011/0269461 A1* | 11/2011 | Xu | H04W 8/183 455/435.2 |
| 2011/0269472 A1* | 11/2011 | Xu | H04W 40/02 455/445 |
| 2011/0270747 A1* | 11/2011 | Xu | G06Q 20/102 705/40 |
| 2012/0284785 A1 | 11/2012 | Salkintzis et al. | |
| 2012/0310720 A1* | 12/2012 | Balsan | G06Q 20/204 705/14.26 |
| 2013/0007849 A1* | 1/2013 | Coulter | G06F 21/10 726/4 |
| 2014/0093071 A1 | 4/2014 | Qiang | |
| 2014/0244514 A1* | 8/2014 | Rodriguez | G06Q 20/10 705/71 |
| 2014/0258110 A1* | 9/2014 | Davis | G06Q 20/227 705/41 |
| 2014/0325025 A1* | 10/2014 | Yeleswarapu | H04L 63/10 709/219 |
| 2015/0089569 A1* | 3/2015 | Sondhi | H04L 63/08 726/1 |
| 2015/0227922 A1* | 8/2015 | Filler | G06Q 20/367 705/41 |
| 2015/0327065 A1 | 11/2015 | Mildh et al. | |
| 2015/0381611 A1 | 12/2015 | Mestanov et al. | |
| 2016/0028737 A1* | 1/2016 | Srinivasan | H04L 63/0807 726/1 |
| 2016/0044440 A1 | 2/2016 | Cha et al. | |
| 2016/0381019 A1 | 12/2016 | Modi et al. | |
| 2017/0024733 A1* | 1/2017 | Purves | G06Q 20/322 |
| 2017/0048702 A1 | 2/2017 | Barrett et al. | |
| 2017/0149837 A1* | 5/2017 | Sondhi | H04L 63/08 |
| 2017/0150469 A1* | 5/2017 | Puusaari | H04L 63/08 |
| 2017/0169713 A1* | 6/2017 | Gong | H04L 63/101 |
| 2017/0228732 A1* | 8/2017 | Badenhorst | G06Q 20/401 |
| 2017/0302655 A1* | 10/2017 | Sondhi | H04L 63/0807 |
| 2017/0346916 A1* | 11/2017 | Kim | H04L 12/2834 |

FOREIGN PATENT DOCUMENTS

| | | | |
|---|---|---|---|
| CN | 101969638 B | | 8/2013 |
| EP | 1788792 A1 | * | 5/2007 |
| EP | 1993310 A1 | | 11/2008 |
| WO | 2016209126 A1 | | 12/2016 |
| WO | 2017016330 A1 | | 2/2017 |
| WO | 2017102020 A1 | | 6/2017 |

OTHER PUBLICATIONS

Samfat et al., "A Method Providing Identity Privacy to Mobile Users During Authentication," Workshop on Mobile Computing Systems and Applications, 1994, IEEE, 5 pages.

Kesdogan et al., "Distributed Temporary Pseudonyms: A New Approach for Protecting Location Information in Mobile Communication Networks," European Symposium on Research in Computer Security (ESORICS'98), 1998, Springer-Verlag, 16 pages.

Van Den Broek et al., "Defeating IMSI Catchers," Proceedings of the 22nd ACM SIGSAC Conference on Computer and Communications Security, Oct. 2015, ACM, 12 pages.

Arkko et al., "RFC 4187—Extensible Authentication Protocol Method for 3rd Generation Authentication and Key Agreement," (EAP-AKA), Jan. 2006, The Internet Society, 80 pages. https://tools.ietf.org/html/rfc4187.

Arkko et al., "RFC 5448—Improved Extensible Authentication Protocol Method for 3rd Generation Authentication and Key Agreement (EAP-AKA')," May 2009, IETF Trust, 30 pages. https://tools.ietf.org/html/rfc5448.

* cited by examiner

AUTHENTICATION DEVICE SELECTION TO FACILITATE AUTHENTICATION VIA AN UPDATEABLE SUBSCRIBER IDENTIFIER

TECHNICAL FIELD

The disclosed subject matter relates to determining an authentication device to receive an authentication request, and, more particularly, to enabling routing of an authentication request comprising a temporary identifier to an authentication device having record of the temporary identifier.

BACKGROUND

Conventional direction of an authentication request can be to any authentication device, e.g., an authentication, authorization, and accounting (AAA) server, etc., where the authentication request comprises a known and fixed subscriber identity. However, the communication of a subscriber identity in an unencrypted manner as part of an authentication request can be generally considered a poor practice because it can allow malicious actions to be undertaken by parties that can access the unencrypted subscriber identity. Better, secured authentication is thus desired.

DETAILED DESCRIPTION

Figure 1:
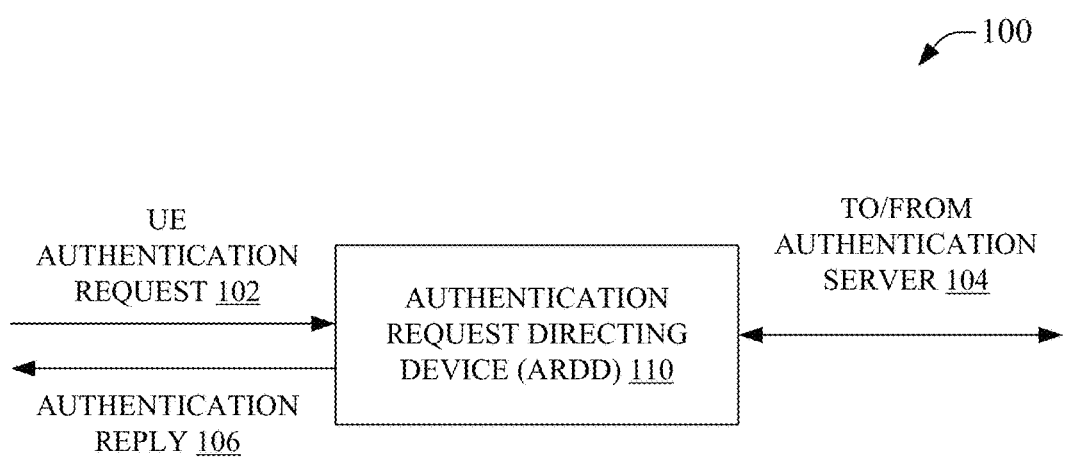
FIG. 1 is an illustration of an example system that can facilitate selection of an authentication device, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, the unencrypted communication of a subscriber identity as part of an authentication request can allow undesirable or malicious actions to be undertaken by parties that can access the unencrypted subscriber identity. One solution is to employ an updateable subscriber identity, e.g., a subscriber identity that changes in a manner known only to the subscriber and the provider, e.g., to a UE and an AAA server, etc. However, deployed carrier networks can be ill suited to use of an updateable subscriber identity, for example, where subscriber identities are distributed among a plurality of authentication devices, a received updated subscriber identity may not be recognized by an authentication device of a group of authentication devices, which can result in a failure to authenticate. In this example, it is still possible that the updated subscriber identity can resolve to an authentication device of the group of authentication devices that can authenticate the subscriber, however, this can be uncertain, e.g., left to chance, in some conventional systems. As such, it can be desirable to dynamically steer an authentication request to an authentication device that can authenticate an updated subscriber identity.

Typically, some conventional routing of an authentication request can be to an authentication device and can expose a subscriber identity. Conventional authentication requests generally communicated a subscriber identity, e.g., an international mobile subscriber identity (IMSI), etc., in the clear and then continued to reuse the same subscriber identity for subsequent authentications. It will be noted that this provided a malicious entity an opportunity to access the subscriber identity, e.g., sent in the clear with each authentication request, and then to reliably know that the subscriber identity would remain unchanged. This provided a security hole that could be leveraged by the malicious entity. However, by updating the subscriber identity in response to a current authentication of a provided subscriber identity, a malicious entity typically cannot reuse the provided subscriber identity in an attempt to falsely authenticate themselves, e.g., the subscriber identity can only be used once and then can be updated to an updated subscriber identity that is hidden from the malicious entity, e.g., encrypted in extensible authentication protocol (EAP) data, etc. The communication of a fixed subscriber identity in an unencrypted manner as part of an authentication request can now generally be considered a poor practice where this protocol can allow malicious actions to be undertaken by parties that have access to the reused and unencrypted subscriber identity.

However, some network carrier systems can be configured to operate most efficiently in a fixed subscriber identity regime. As an example, where a pool of authentication devices, e.g., authentication, authorization, and accounting (AAA) servers, etc., are deployed regionally and endowed with all fixed subscriber identities, a UE can authenticate to any authentication device of the pool because they can each have all the fixed subscriber identities. Where subscriber identities are updatable, rather than fixed, an update to a subscriber identity can be pushed to all other authentication devices of the pool to enable the UE to authenticate to any authentication device of the pool using the updated subscriber identity. However, such embodiments can create an inordinate amount of network traffic where each and every subscriber authentication, and corresponding subscriber identity update, results in network traffic to update of each other authentication device of the authentication pool. In an aspect, rather than updating all pool authentication devices, the authentication device that provides the updated subscriber identity can be associated with the UE providing the currently authenticated subscriber identity. This can enable steering a subsequent authorization request comprising the updated to subscriber identity to be resolved at the authentication device that has a record of the updated subscriber identity. By steering the subsequent authentication request to the authentication device of the pool that has record of the updated subscriber identity, the other authentication devices of the pool do not need to be updated with the updated subscriber identity because the subsequent authentication request will not be steer to other authentication devices of the pool that do not have record of the updated subscriber identity. Of note, a first authentication device can have an affiliated backup second authentication device to protect against failure of the first authentication device, however updating the second authentication device with updated subscriber identities can be much less onerous than updating all other authentication devices of the pool. Similarly, steering of the subsequent authorization request can be to the backup second authorization device, e.g., where the first authentication device is unavailable.

Employing an updateable subscriber identity can therefore be implemented on some existing and legacy network carrier systems, e.g., network carrier core network components, etc. As an example, a UE can undergo a first authentication, e.g., the first time a cell phone is turned on with a newly inserted subscriber identity module (SIM), etc. The SIM can provide an IMSI for the authentication request. The UE identity, e.g., a UE media access control address (MAC address), international mobile equipment identity (IMEI), Settings.Secure.ANDROID_ID (SSAID), universal device ID (UDID), globally unique ID (GUID), etc., can be associated with the authentication request. The IMSI can be used by an authentication device, such as an AAA of a wireless network carrier, etc., to authenticate the UE. The authentication device can provide an updated subscriber identity back to the UE for use in a subsequent authorization request. It will be noted that the updated subscriber identity can be sent in a protected manner to the UE, e.g., encrypted in EAP data, etc. In the example, the identity of the authentication device associated with the updated subscriber identity can be captured by a device practicing the disclosed subject matter. The authentication device identity can then be correlated to the UE identity. This correlation can be stored. As such, when a subsequent authentication request is sent by the UE, which authentication request will comprise the updated subscriber identity rather than the IMSI sent the first time, the UE identity can be employed to determine the correlated authentication device identity such that the authentication request can be directed to the correlated authentication device. Where the correlated authentication device has record of the updated subscriber identity, authentication can proceed and a second updated subscriber identity can be returned to the UE.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate selection of an authentication device, in accordance with aspects of the subject disclosure. System 100 can comprise authentication request directing device (ARDD) 110. ARDD 110 can receive UE authentication request 102. In an aspect, ARDD 110 can act in a manner similar to a proxy and can send UE authentication request 102 on towards an authentication device. In some embodiments, ARDD 110 can alter data passing through ARDD 110, e.g., UE authentication request 102, to/from authentication server 104, authentication reply 106, etc. As an example, where UE authentication request 102 comprises a pseudonym, e.g., a temporary subscriber identifier, the pseudonym can be altered by ARDD 110 prior to being sent on to an authentication device, e.g., via to/from authentication server 104. In an aspect, this example perturbation of the pseudonym can be done to elicit a response from the example authentication device, such as triggering a response that the UE provide an IMSI in any subsequent authentication request.

ARDD 110 can inspect incoming UE authentication request 102 to determine characteristics or properties of the authentication request, e.g., a provided subscriber identity, a device identity, presence of an EAP payload, etc. The inspection of UE authentication request 102 can therefore result in identifying a source of the authentication request, e.g., an identity of a UE that transmitted UE authentication request 102. In an embodiment, ARDD 110 can determine if an authentication device is correlated to the identified source of UE authentication request 102, e.g., has an AAA server been correlated to authentication requests from the UE. Where the UE is correlated to an authentication device, then UE authentication request 102 can be directed to the authorization device. Where the UE is not correlated to the authentication device, ARDD 110 can direct UE authentication request 102 to an authentication device and then monitor responses to UE authentication request 102, e.g., via to/from authentication server 104, to determine a correlation between the source device, e.g., the UE, and an authentication device, e.g., the responding authentication device. This determined correlation can facilitate ARDD 110 in directing subsequent authentication requests to the authentication device, e.g., the example responding authentication device. ARDD 110 can then pass the response to the authentication request back towards the UE as authentication reply 106.

In an aspect, ARDD 110 can be located on a network between a UE and an authentication device such as an AAA server, etc. As examples, ARDD 110 can be located at a Wi-Fi access point, at a radio access network (RAN) device, at a NodeB/eNodeB, as an internet node, at a carrier core-network operations center, as a virtualized component of a carrier core-network operations center, etc. It will be noted that where ARDD 110 is located in a carrier network component, e.g., a carrier core-network component, that transport of data, e.g., to/from authentication server 104, can be considered secure in that it can be physically or logically unavailable to entities outside of those permitted by the carrier, e.g., ARDD 110 can be part of a proprietary network to provide secure transport of data inside the proprietary network in contrast to publicly accessible nodes of the internet, etc. As such, for example, a UE can transmit UE authentication request 102 via a Wi-Fi access point. The example UE authentication request 102 can travel over nodes of the internet that may or may not be secure, private, etc., before arriving at ARDD 110. Where ARDD 110 is, for example, located in a carrier core-network, passing the authentication request on to an AAA server, e.g., via to/from authentication server 104, can be in a private, secure, etc., environment. Similarly, a reply to the authentication request from the example AAA server, e.g., as to/from authentication server 104, can be transported back to ARDD 110 via the example carrier core-network in a private and secure manner. ARDD 110 can then correlate the responding AAA server to the UE of UE authentication request 102 and pass the response, as authentication reply 106, back over the open internet to the UE via the example Wi-Fi access point. It will be noted that core-network components, or other private network component associated with a carrier entity, wired/wireless network provider, etc., can comprise logical separations, e.g., the devices providing services associated with an aspect of the carrier entity operations can be distinct logically, and also physically, from devices providing other services associated with the aspect, or other aspects, of the carrier entity operations. As an example, mobility operations for a wireless carrier can be provided by a first device or first system, while provisioning operation can be provided by a second device/system, and web service operations can be provided by a third device/system of the carrier. It can be desirable to operate these distinct device/systems independently such that a change in one device/system does not adversely affect other devices/systems, e.g., the device/systems can be siloed to enable interoperability and independence from the other devices/systems. As such, while routing or an incoming authentication request could be implemented in an AAA server system directly, this can have other undesirable effects on the operation of the AAA sever device/system. The disclosed subject matter can enable operation of a typical AAA server to remain unchanged by managing correlation of an authorization device to a UE as a standalone component that can be external to the AAA server device/system of an example carrier entity.

In an aspect, ARDD 110 can be located between authentication request endpoints, e.g., a UE device and an authentication device. In some embodiments, ARDD 110 can receive UE authentication request 102 directly from a UE, e.g., where ARDD 110 is comprised in, or collocated with, a RAN device, a femtocell device, a Wi-Fi access point device, etc. In other embodiments, ARDD 110 can receive UE authentication request 102 via another device, e.g., via a Wi-Fi Access Point device, RAN device, a NodeB/eNodeB device, an internet node, a carrier core-network device, etc. Similarly, depending on placement of ARDD 110 in the path between the endpoints, to/from authentication server 104 can have any number of hops between ARDD 110 and an authentication device, such as an AAA server. As an example, where ARDD 110 is located at a first carrier device/system, e.g., carrier web services core components 470, and the diameter edge agent (DEA), e.g., DEA 406 and AAA servers are located at another carrier device/system, e.g., carrier mobility core components 490, then to/from authentication server 104 can pass through the carrier networks to reach the DEA/AAA servers, e.g., hop from carrier web services core components 470 to carrier VPN core components 480 to carrier mobility core components 490, etc. Similarly, the path can be reversed or different to reply to the authentication request, e.g., the path back to ARDD 110 can be different than the example path to the AAA server from ARDD 110. Additionally, the path between ARDD 110 and the UE for UE authentication request 102 can be the same as, or different from, the path of authentication reply 106.

Figure 2:
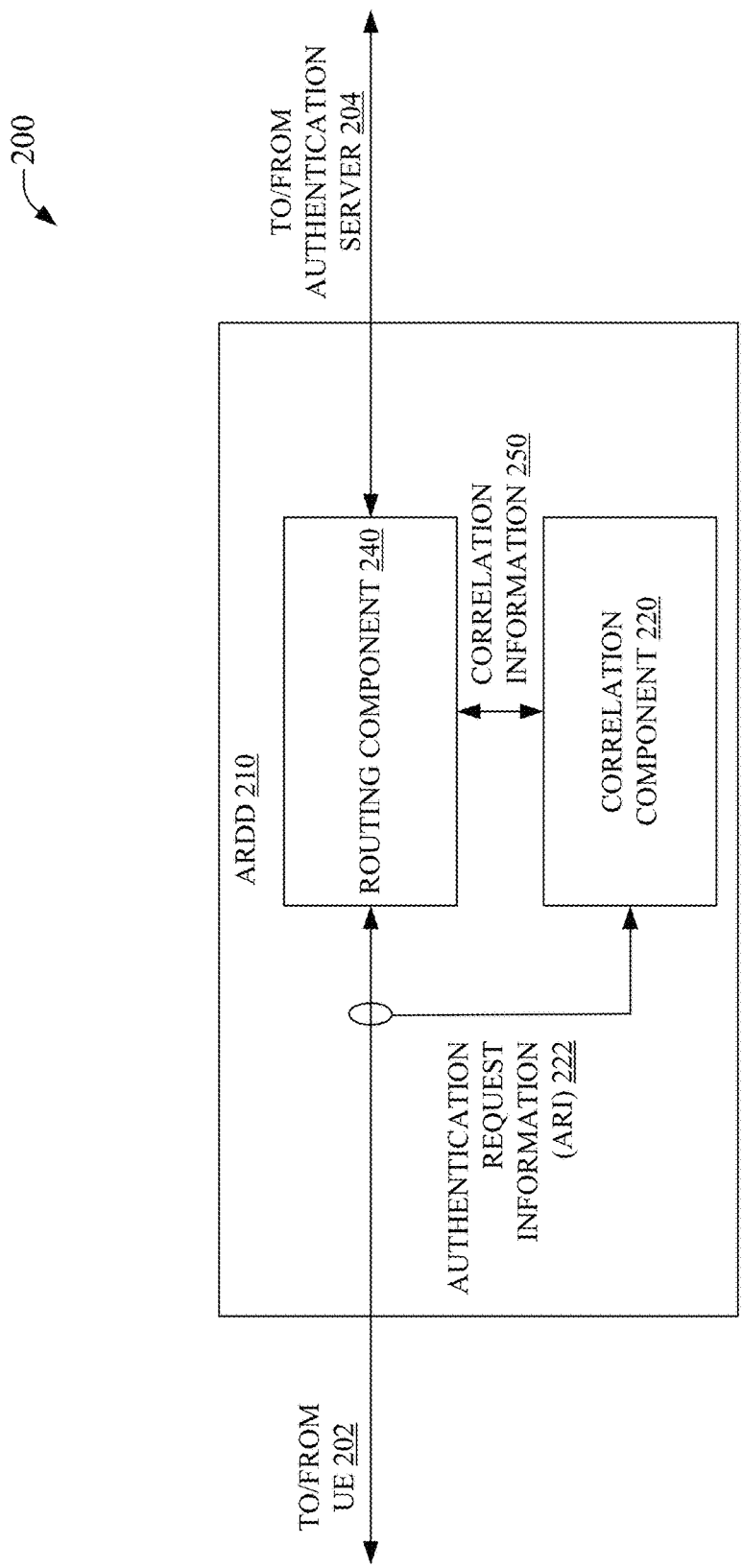
FIG. 2 is an illustration of an example system that can facilitate selection of an authentication device based on inspection of an incoming authentication request, in accordance with aspects of the subject disclosure.

FIG. 2 is an illustration of a system 200, which can enable selection of an authentication device based on inspection of an incoming authentication request, in accordance with aspects of the subject disclosure. System 200 can comprise ARDD 210. ARDD 210 can receive an authentication request, e.g., via to/from UE 202. In an aspect, ARDD 210 can send the authentication request on to an authentication device. ARDD 210 can comprise routing component 240 that can route the incoming authentication request to a determined authentication device via to/from authentication server 204. The routing of the authentication request can be based on correlation information 250 received from correlation component 220. Correlation information 250 can represent a correlation between a prior responding authentication device and the source of the presently incoming authentication request. As an example, a first ever authentication request from a UE 'E3Cp1' can comprise an IMSI '1234' and can be responded to by authentication device 'XYZ', as such, XYZ can be correlated to E3Cp1. Further, the response from XYZ can comprise an updated subscriber identity, e.g., a temporary subscriber identity, of '5x6y' to be used in lieu of the IMSI at the next authentication event. For a next authentication request from E3Cp1, the subscriber identity 5x6y can be passed into ARDD 210. ARDD 210 can, for example, determine via correlation component 220 that E3Cp1 is correlated to authentication device XYZ and can direct that the authentication request comprising subscriber identity 5x6y be sent to XYZ. Whereas XYZ has record of the subscriber identity 5x6y, XYZ can proceed with authentication and subsequent updating of 5x6y to a newer temporary subscriber identity.

In this example, where ARDD 210 does not associate E3Cp1 with XYZ, then the authentication request can be sent to any authentication device and, accordingly, if the receiving authentication device does not have record of 5x6y, the authentication can fail for 'unknown user' type reasons. In systems where only a single authentication device is used, this can be of minimal concern because the authentication device can be expected to keep track of updated temporary subscriber identities. However, in systems where more than one authentication device is employed and the authentication devices are not continuously synchronized, the subscriber identity records can differ between the two or more authentication devices, which can result in a failure to authenticate a subscriber based on an unknown temporary subscriber identity. As disclosed previously, the use of ARDD 210 can allow authentication device systems to operate without modification by allowing ARDD 210 to determine routing of incoming authentication requests.

Correlation component 220 can monitor an incoming authentication request, e.g., via monitoring data passing as to/from UE 202 to routing component 240 which can be termed authentication request information (ARI) 222. ARI 222 can enable correlation component 220 to determine source device identifying information, e.g., a UE identity such as a MAC address, etc. This identifying information can be correlated to an authentication device that has record of a subscriber identity, e.g., an IMSI, a temporary subscriber identity, etc. It will be noted that the source device identifying information and the subscriber identity are different. The source device identifying information identifies, for example, a UE device, while the subscriber identity identifies, for example, a subscriber affiliated with the source device. As an example, a smartphone can comprise a subscriber identity module (SIM) card. The smartphone can have a radio MAC address and the SIM card can comprise a subscriber identity, whereby an authentication request can comprise the radio MAC address and the subscriber identity. ARDD 210 can, for example, affiliate the radio MAC address of the smartphone with an authentication device that sends an authentication reply in response to an attempt to authenticate to the subscriber identity from the SIM card. This allows ARDD 210 to ignore the subscriber identity when routing an authentication request to a determined authentication device because the authentication device can be determined from a correlation of the source device to a particular authentication device during a previous authentication event. It will be noted that data corresponding to a correlation between an authentication request source device, e.g., a UE, and an authentication device, e.g., an authentication server, etc., can be stored to facilitate determining the authentication device by correlation component 220 based on observation of a device identifier from an incoming authentication request.

In some embodiments, ARDD 210 can alter data passing through ARDD 210, e.g., the authentication request, e.g., via to/from UE 202, data transported via to/from authentication server 204, etc. As an example, a temporary subscriber identity of the type comprised in the authentication request can be altered by ARDD 210 prior to being sent to an authentication device, such as to cause the authentication device to respond by generating a request for an original subscriber identity from the supplicant device, rather than with a temporary subscriber identity. Of note, ARI 222 can comprise source device identifying information that can be determined from observance of an authentication request passing to routing component 240 via to/from UE 202. As such, ARI 222 can be the same or different from the authentication request, e.g., ARI 222 can be a copy of the authentication request, can be only the source identifying information gleaned from the authentication request, etc.

It will further be noted that ARDD 210 can be operationally transparent, e.g., ARDD 210 can have a network address, etc., but can be treated as a non-interactive network node in an authentication protocol, e.g., ARDD 210 can be treated as any other routing node by, for example, a RADIUS/DIAMETER type authentication protocol, etc. ARDD 210 is typically not intended to significantly modify an authentication request between the UE and the authentication server or the response to the authentication request. Moreover, ARDD 210 typically does not duplicate authentication requests, packets, etc., e.g., to send to more than one authentication device, etc. While, an authentication request can be perturbed by ARDD 210, the perturbation is generally limited to directing the routing of the authentication request to a determined authentication device, perturbation of a subscriber identity, or other perturbations germane to operation of systems for authentication with temporary subscriber identities.

Figure 3:
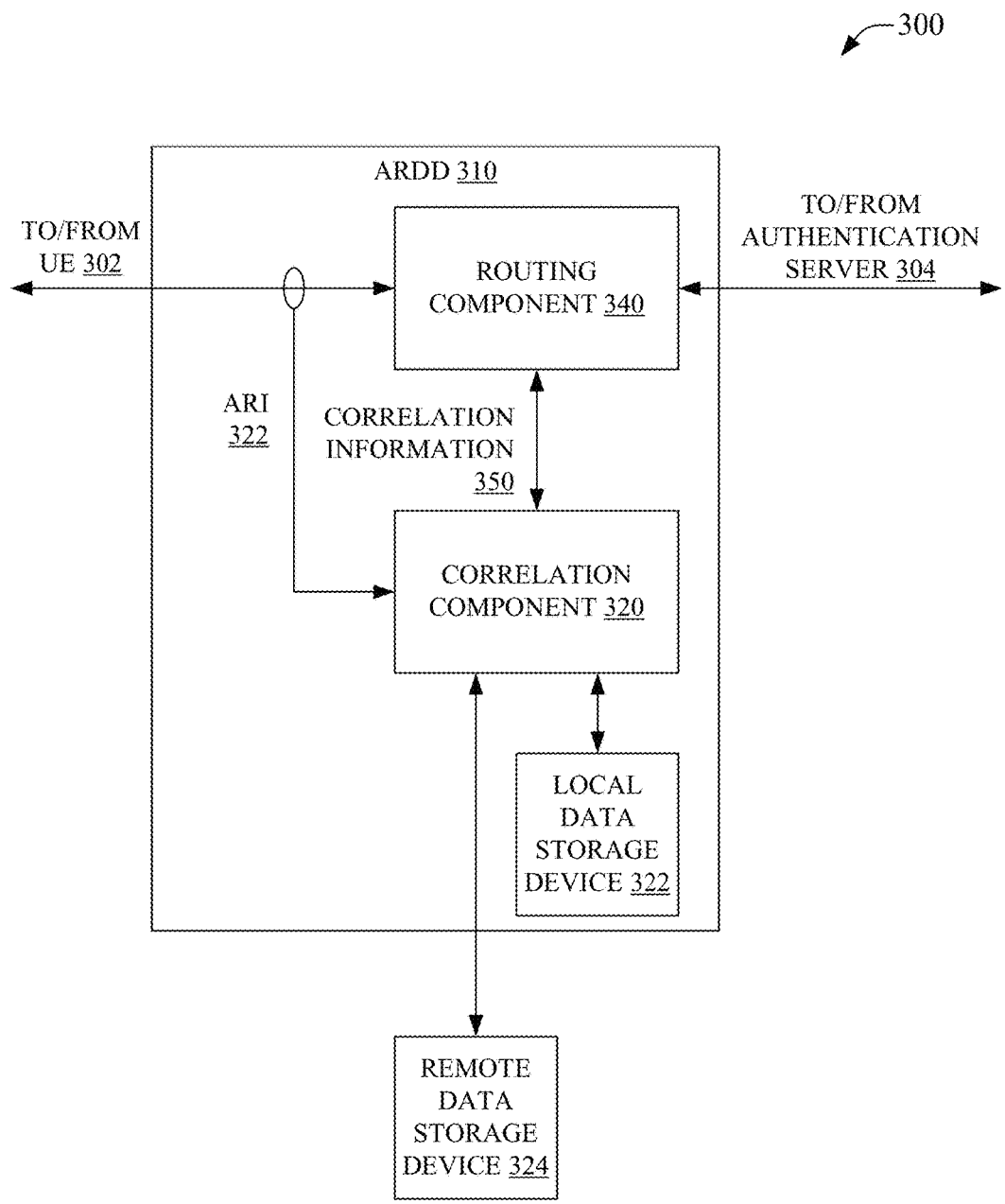
FIG. 3 is an illustration of an example system that can enable selection of an authentication device based on stored correlation data, in accordance with aspects of the subject disclosure.

FIG. 3 is an illustration of a system 300, which can facilitate selection of an authentication device based on stored correlation data, in accordance with aspects of the subject disclosure. System 300 can comprise ARDD 310 that can receive an authentication request, e.g., via to/from UE 302. In an aspect, ARDD 310 can direct or steer the authentication request to a determined authentication device via to/from authentication server 304. ARDD 310 can comprise routing component 340 that can steer or direct the incoming authentication request to the determined authentication device. The routing of the authentication request can be based on correlation information 350 received from correlation component 320. Correlation information 350 can represent a correlation between a prior responding authentication device and the source of the in presently incoming authentication request. Moreover, where ARDD 310 does not identify a correlation between a device and an authentication device, then the authentication request can be sent to any authentication device and, accordingly, if the receiving authentication device does not have record of the subscriber identity, then the authentication can fail for 'unknown user' type reasons. In systems where only a single authentication device is used, the authentication device can be expected to keep track of the most recent updated temporary subscriber identity for a subscriber account. In systems where more than one authentication device can be employed and the authentication devices may not by sufficiently synchronized, a subscriber identity record can fail to be recognized by the particular authentication device to which the authentication request has been sent. This can result in a failure to authenticate a valid subscriber based on an unknown temporary subscriber identity. Use of ARDD 310 can overcome this issue, generally with no modification of other existing systems/devices, by allowing an appropriate authentication device to receive the incoming authentication requests as steered by ARDD 310.

Correlation component 320 can monitor an incoming authentication request by receiving ARI 322. ARI 322 can enable correlation component 320 to determine source device identifying information, e.g., a UE identity such as a MAC address, etc. This identifying information can be correlated to an authentication device that previously had, or currently has, record of a subscriber identity, e.g., an IMSI, a temporary subscriber identity, etc. It will be noted that where authentication devices operate as a silo of devices that is independent of the operation of ARDD 310, balancing, repair, addition, or subtraction of authentication devices of an authentication device pool can result in the correlation information of ARDD 310 becoming stale. As an example, a first authentication device can be correlated to a UE, whereby it is presumed that the first authentication device has record of a subscriber identity used affiliated with the UE. However, where the first authentication device, for example, becomes heavily burdened, a portion of the authentication records can be moved to one, or more, other authentication devices. Where, in this example, the subscriber identity affiliated with the UE is moved to a second authentication devices, and because the operation of ARDD 310 and the authentication system are separately siloed, the correlation between the first authentication device and the UE can result in passing the subscriber identity to the first authentication device rather than the second authentication device, which can result in a failed authentication. Where the correlation is broken, ARDD 310 can determine, in response to a next successful authentication to another authentication device of the authentication device pool by the UE, a responding authentication device to reestablish the correlation record. In an embodiment, this can be facilitated by perturbing the value of a subsequent authentication request by the same UE with the same subscriber identity after a previous response from the correlated authentication device. In short, ARDD 310 is ignorant of the content of the response to the first authentication request (which failed because the subscriber identity record had been moved to another authentication device), however ARDD 310 can observe a subsequent request to authenticate from the same UE with the same exposed subscriber identity (the subscriber identity is typically not encapsulated in an encrypted element of an incoming authentication request), and can assume that the previous request failed. In response ARDD 310 can perturb the subscriber identity before forwarding the authentication request to the authentication device. Where the authentication device receives subsequent authentication requests for the same device with different subscriber identities, the authentication device can generally response with a request for the UE to send a true subscriber identity, typically the IMSI originally affiliated with the subscriber via the SIM card. Where the UE then sends the IMSI to the authentication device, the authentication device can proceed with the authentication and respond with a new temporary subscriber identity. It will be noted that in typical EAP protocols the temporary subscribe identity is protected, e.g., encrypted, etc., unlike the subscriber identity comprised in an authentication request. Where the authentication device responds to the IMSI authentication event, ARDD 310 can update the correlation between the UE and the responding authentication device to enable a subsequent authentication request, e.g., an authentication request comprising the new temporary subscribe identity, to be routed to the authentication device that will have record thereof.

Correlation component 320 can be coupled to a data store to enable storing data enabling determining of correlation information 350. In some embodiments, ARDD 310 can, comprise local data storage device 322. ARDD 310 can be connected to remote data storage device 324 in some embodiments, wherein remote data storage device 324 is typically located distant from ARDD 310, e.g., cloud storage, storage at a remote data center, storage at another core-network component, etc. Correlation component 320 can store data to, and/or receive data from, local data storage device 322, remote data storage device 324, etc. The stored data can facilitate correlation component 320 determining an authentication device correlated to a device identity affiliated with an incoming authentication request and comprised in ARI 320. Information related to the correlated authentication device, e.g., a network location of the authentication device, etc., can be communicated to routing component 340 in correlation information 350, which can enable routing component 340 to route the authentication request to the determined authentication device.

Figure 4:
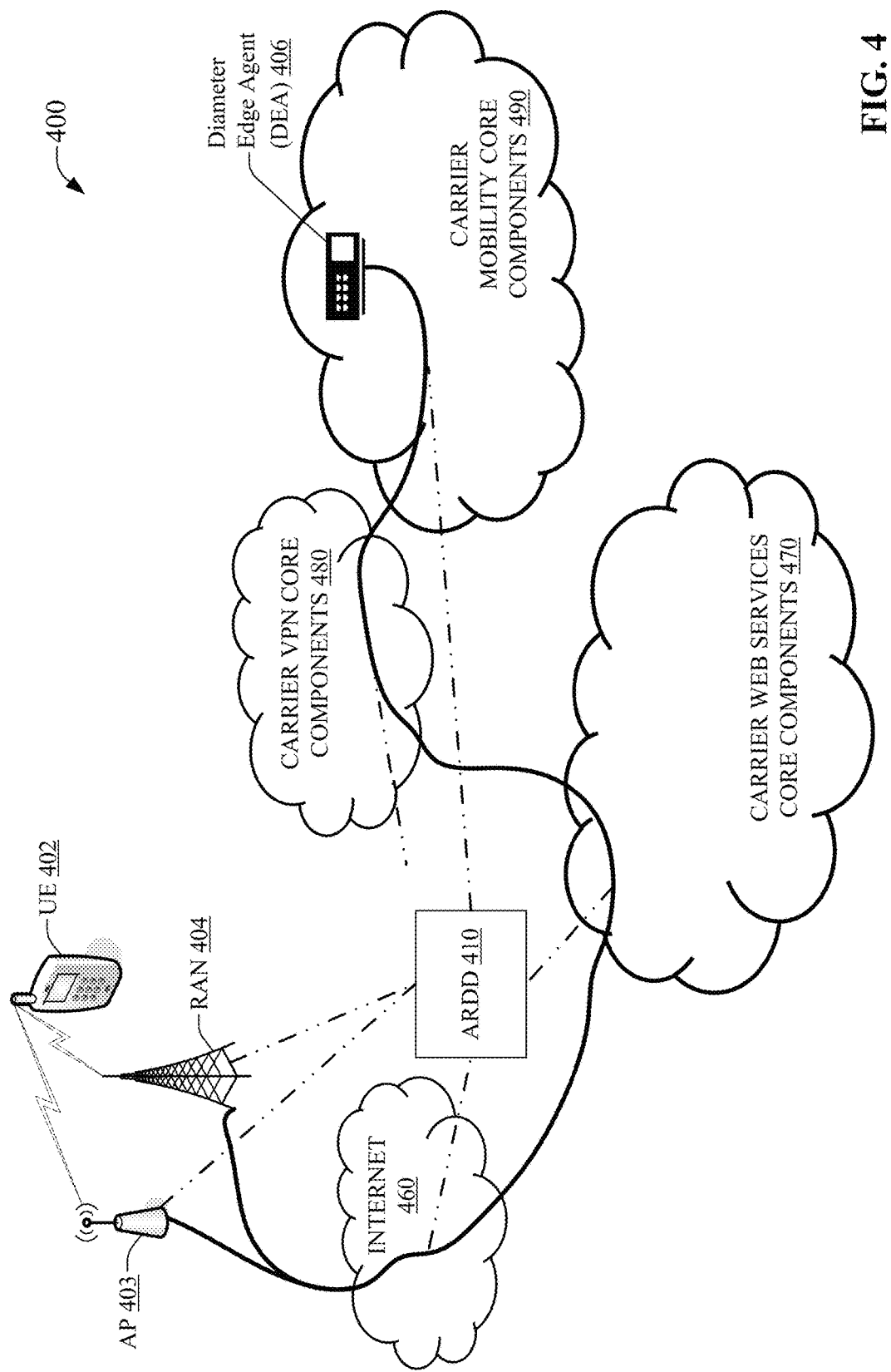
FIG. 4 illustrates an example system that can facilitate selection of an authentication device via an intermediary device that can be located at various locations between end devices, in accordance with aspects of the subject disclosure.

FIG. 4 is an illustration of a system 400, which can enable selection of an authentication device via an intermediary device that can be located at various locations between end devices, in accordance with aspects of the subject disclosure. System 400 can comprise UE 402, which can communicate a request for authentication via either access point (AP) 403 or RAN 404. AP 403 and RAN 404 can be connected, e.g., via internet 460, etc., to a carrier network device, e.g., a carrier core-network component, for example, carrier web services core components 470, etc. Core-network components of the network carrier can be interconnected by a private network that can provide secure transport of data within the private network. As such, data can typically be securely transported between the several core-network devices/systems forming the overall network carrier core-network. System 400 illustrates a communication path between UE 402 and DEA 406. The communication path can traverse AP 403 or RAN 404, internet 460, and one or more carrier core-network components, e.g., carrier web services core components 470, carrier VPN core components 480, carrier mobility core components 490, etc.

System 400 can further comprise ARDD 410. ARDD 410 can receive an authentication request from UE 402. In an aspect, ARDD 410 can direct or steer the authentication request to a determined authentication device (not illustrated) coupled to DEA 406. The routing of the authentication request can be based on correlation information that can represent a correlation between a prior responding authentication device and UE 402. Where ARDD 410 does not, or cannot, identify a correlation between a UE 402 and a specific authentication device, then the authentication request can be sent to any authentication device, e.g., coupled to DEA 406, coupled to another DEA, etc. Accordingly, if the receiving authentication device does not have record of the subscriber identity, then the authentication can fail, e.g., for 'unknown user' type reasons, etc. In systems where only a single authentication device is used, the authentication device can be expected to keep track of the most recent updated temporary subscriber identity for a subscriber account. In systems where more than one authentication device can be employed and the authentication devices may not by sufficiently synchronized, a subscriber identity record can fail to be recognized by the particular authentication device to which the authentication request has been sent. This can result in a failure to authenticate a valid subscriber based on an unknown temporary subscriber identity. Use of ARDD 410 can overcome this issue, generally with no modification of other existing systems/devices, by allowing an appropriate authentication device to receive the incoming authentication requests as steered by ARDD 410.

In an aspect, ARDD 410 can be located anywhere between the endpoints, e.g., UE 420 and DEA 406 in system 400. As examples, ARDD 410 can be located at any location designated by the dot-dot-dash lines. Selecting or designating a location of ARDD 410 can be subject a constraint, such as an input protocol and output protocol of ARDD 410 satisfying input/output protocols of devices on either side of ARDD 410. In some embodiments of system 400, ARDD 410 can be located at carrier web services core components 470. In an aspect, location of ARDD 410 at this location can provide secure transport of data between ARDD 410 and DEA 406 via the private network of a network carrier in system 400. This can be beneficial in that there is a reduced exposure of the authentication device to entities outside of the carrier network. However, these benefits can be outweighed by other considerations, such as cost, distance, access, support, etc., that can cause other locations to be advantageous. Other possible locations indicated for ARDD 410 can be at AP 403, at RAN 404, at an internet node of internet 460, at carrier VPN core components 480, at carrier mobility core components 490, etc. In some embodiments, ARDD 410 can be comprised in UE 402, e.g., UE 402 can steer an authentication request directly to an authentication device corresponding to the most recent temporary subscriber identity, etc. In these embodiments, the ARDD 410 can be limited to steering authentication requests from only UE 402, generally to the exclusion of other authentication requests from other UEs. In some embodiments ARDD 410 can be comprised in DEA 406 or even in an authentication device. In these embodiments, the disclosed subject matter begins to collapse into modification of the authentication device core-network device/system and the benefits of keeping the authentication systems in a separate silo begin to be eroded.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
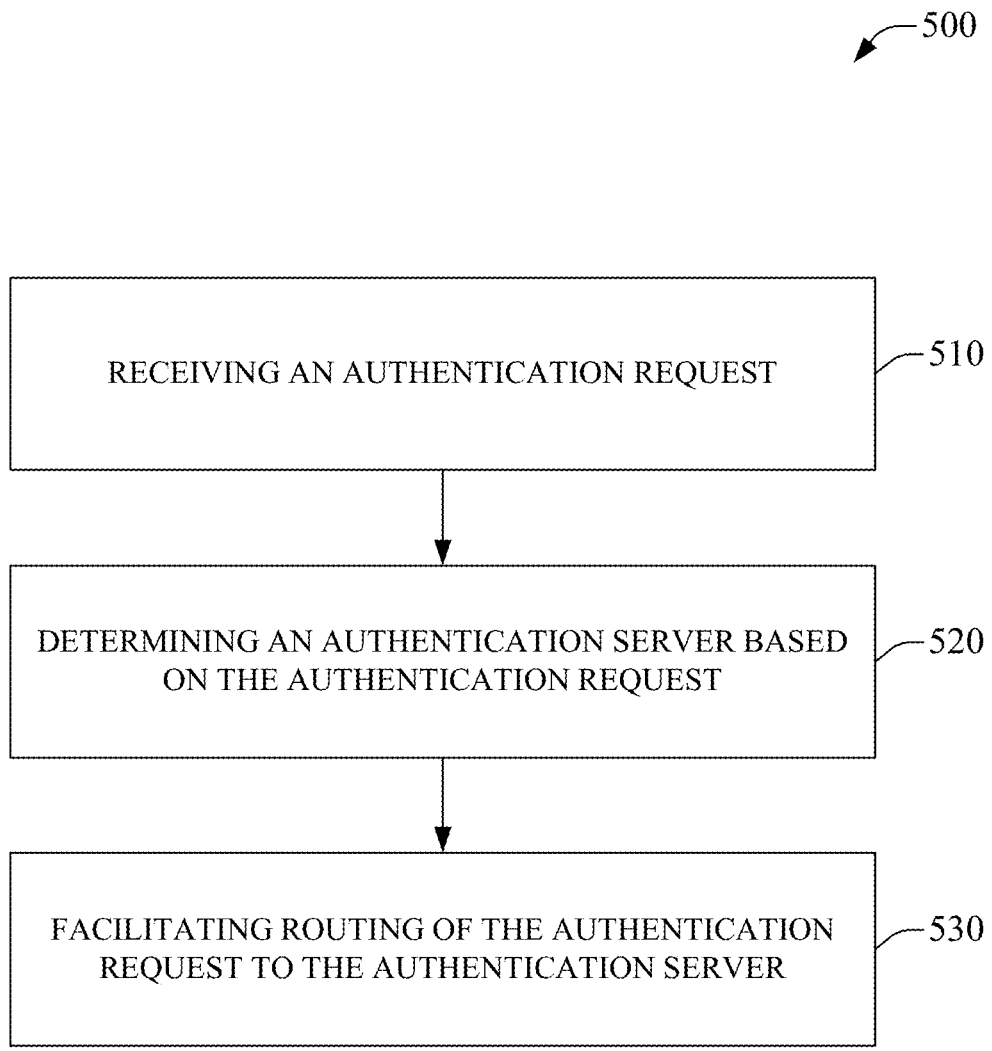
FIG. 5 is an illustration of an example method facilitating routing of an authentication request to a determined authentication device, in accordance with aspects of the subject disclosure.

FIG. 5 is an illustration of an example method 500, which can facilitate routing of an authentication request to a determined authentication device, in accordance with aspects of the subject disclosure. At 510, method 500 can comprise receiving an authentication request. The authentication request can be transmitted by a UE. The authentication request can be transported from the UE via a network device, e.g., AP 403, RAN device 404, etc.

At 520, method 500 can comprise determining an authentication server based on the authentication request. The authentication request can comprise information that can be correlated with authentication via a particular authentication device, e.g., authentication server, etc. As an example, the authentication request can comprise a device identifier that can correspond to authentication via a particular authentication service.

Method 500, at 530, can comprise facilitating routing of the authentication request to the authentication server determined at 520. At this point method 500 can end. In an embodiment, the authentication request received at 510 can be steered or routed to the authentication server determined at 520 in response to a previous correlation between the authentication server and an aspect of the authentication request, e.g., a device identifier comprised in the authentication request.

Figure 6:
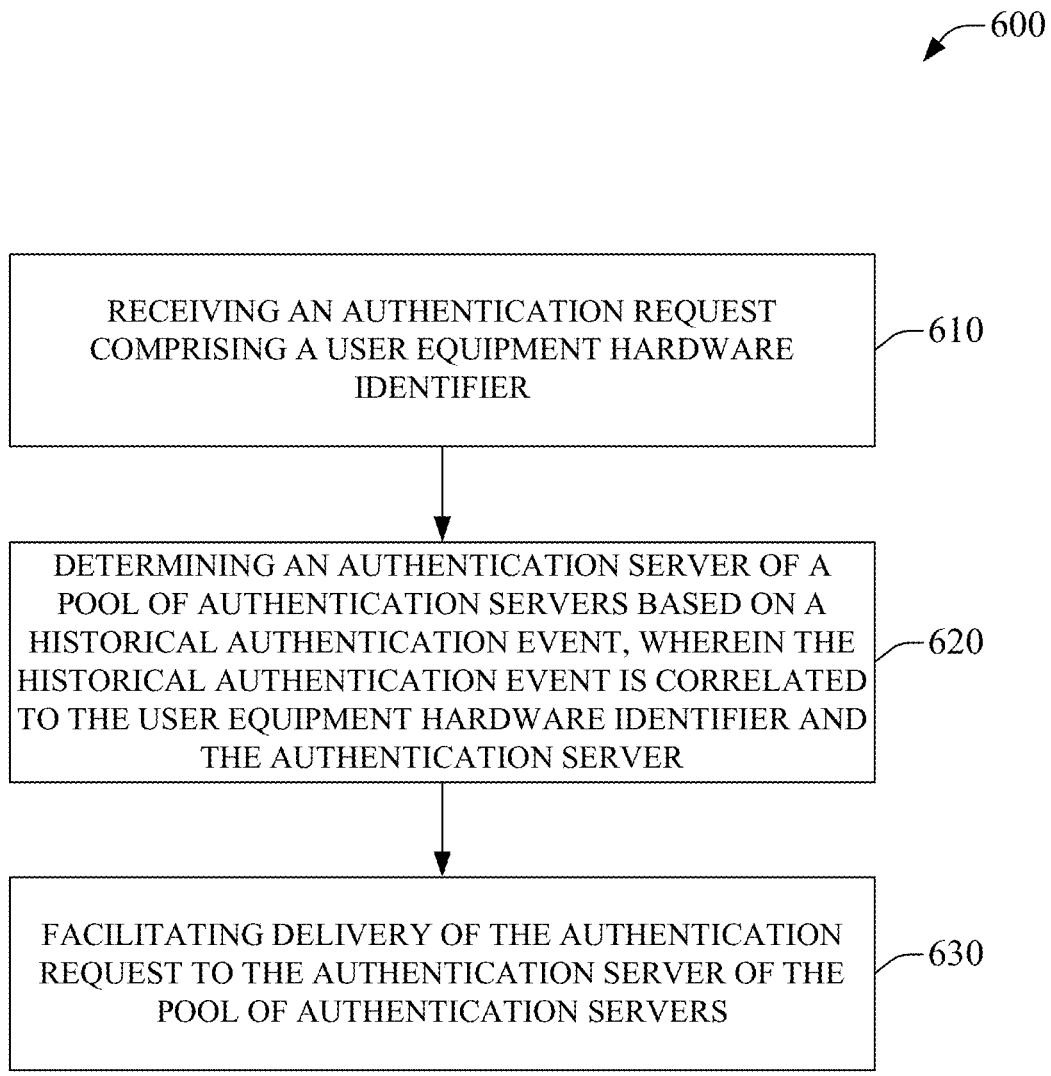
FIG. 6 is an illustration of an example method enabling selection of an authentication device based on a UE identifier, in accordance with aspects of the subject disclosure.

FIG. 6 is an illustration of an example method 600, which can facilitate selecting an authentication device based on a UE identifier, in accordance with aspects of the subject disclosure. At 610, method 600 can comprise receiving an authentication request comprising a UE hardware identifier. As an example, a UE hardware identifier can be a radio MAC address, an IMEI, SSAID, UDID, GUID, etc. The identity associated with the physical device, e.g., UE, etc., providing access to services associated with a subscriber identity, e.g., via a SIM, etc., can be associated with an authentication device. Typically the authentication device has previously interacted with the identified UE to perform an authentication of the subscriber identity. As such, it is generally presumed that the authentication device will have record of the subscriber identity associated with the subscribing entity, e.g., an IMSI, a temporary subscriber identity, a pseudonym, etc., can be on record in the authentication device. However, where a network carrier can have many authentication devices that may not have synchronized records of subscriber identities, it can be effective to steer an authentication request to an authentication device that is likely to have record of the most recent subscriber identity associated with the subscribing entity.

At 620, an authentication server of a pool of authentication servers can be determined. The determining can be based on a historical authentication event. The historical authentication event can be used to correlate the authentication server and the user equipment hardware identifier of the historical authentication event, e.g., a UE can be tied to an AAA server from a previous authentication event. This correlation can support an assumption that the authentication server will have record of an updated subscriber identity, e.g., where the subscriber identity is updated at each authentication event, the last authentication server can be expected to have record of the last update to the subscriber identity value.

In an aspect, the subscriber identity, e.g., where updated by a specific authentication server, may not be propagated to other authentication servers of the pool of authentication servers. Where the updated subscriber identity is used to attempt to authentication on an authentication server that does not have record of the updated subscriber identity, the authentication can fail because the identity is not known. As such, it can be desirable for the authentication to occur at an authentication server that does have record of the updated subscriber identity, e.g., the last authentication server to update the subscriber identity or a backup authentication thereto. Method 600 provides for determining an authentication server that is likely to have record of the most recent update of a subscriber identity, based on correlating the authentication server with the UE hardware identifier.

At 630, method 600 can comprise facilitating delivery of the authentication request to the authentication server of the pool of authentication server. At this point, method 600 can end. The authentication request received at 610 can be routed to the authentication server determined at 620 based on the UE hardware identifier comprised in the authentication request. This can facilitate steering the authentication request to an authentication server that is likely to have record of the subscriber identity of the authentication request. This can facilitate authentication of the subscriber.

Figure 7:
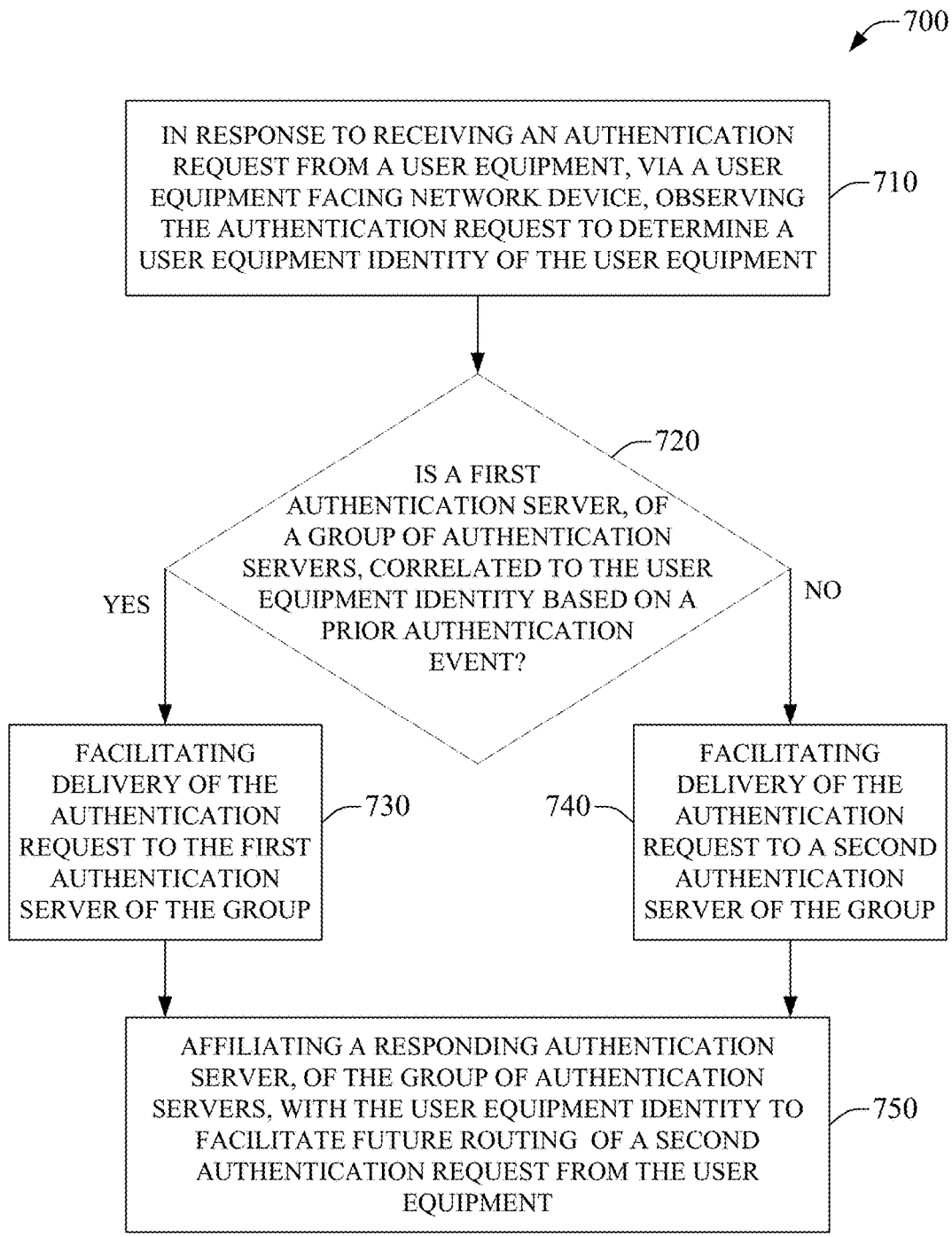
FIG. 7 illustrates an example method facilitating selection of an authentication device based on a prior authentication event, in accordance with aspects of the subject disclosure.

FIG. 7 illustrates example method 700 that facilitates selecting an authentication device based on a prior authentication event, in accordance with aspects of the subject disclosure. Method 700, at 710, can comprise observing an authentication request in response to receiving the authentication request from a UE via a UE facing network device. A UE identity, e.g., a radio MAC address, an IMEI, SSAID, UDID, GUID, etc., of the UE can be determined via the observing of the authentication request.

At 720 it can be determined if a first authentication server of a group of authentication servers is correlated to the UE identity. The correlation can be based on a prior authentication event. Where an authentication device has previously performed an authentication of a subscriber identity with a UE having the UE identity, it can be presumed that the authentication device will have record of the subscriber identity, e.g., an IMSI, a temporary subscriber identity, a pseudonym, etc. As such, the historical authentication event can be used to correlate the authentication server and the UE identity as a construct for identifying an authentication server that can likely have record of the subscriber identity from among a pool of authentication servers, e.g., where the subscriber identity is updated at each authentication event, the last authentication server can be expected to have record of the last update to the subscriber identity value.

Method 700 can proceed to block 730 where the first authentication server of a group of authentication servers is determined to be correlated to the UE identity at 720. At 730, method 700 can comprise facilitating delivery of the authentication request from 710 to the first authentication server of the group of authentication servers. Furthermore, method 700 can proceed to block 740 where the first authentication server of a group of authentication servers is not determined to be correlated to the UE identity at 720. At 740, method 700 can comprise facilitating delivery of the authentication request from 710 to a second authentication server of the group of authentication servers. In an aspect, the second authentication can be the same as the first authentication, e.g., at 740, the authentication request can be steered to any authentication server of the group of authentication servers because none of them have been correlated to the UE identity and, as such, each authentication server of the group is likely to request an IMSI to authenticate, and then will issue an updated subscriber identity that can result in correlation of the responding authentication server to the UE identity from 710.

At 750, method 700 can comprise affiliating a responding authentication server with the UE identity. At this point method 700 can end. Method 700 can proceed to block 750 from with block 730 or block 740. Where method 700 proceeds to block 750 from block 730, the responding server can update a previously updated subscriber identity. This is likely to result in the responding authentication server having record of the updated subscriber identity and therefore justifying the use of the affiliated UE identity to steer a next authentication request from the UE to the responding authentication server with a likelihood of successful authentication. Where method 700 proceeds to block 750 from block 740, the responding server can update a true subscriber identity, e.g., an IMSI to a temporary subscriber identity. This is again likely to result in the responding authentication server having record of the updated, e.g., temporary, subscriber identity and therefore justify employing the affiliated UE identity to steer a next authentication request from the UE to the responding authentication server with a likelihood of successful authentication.

Figure 8:
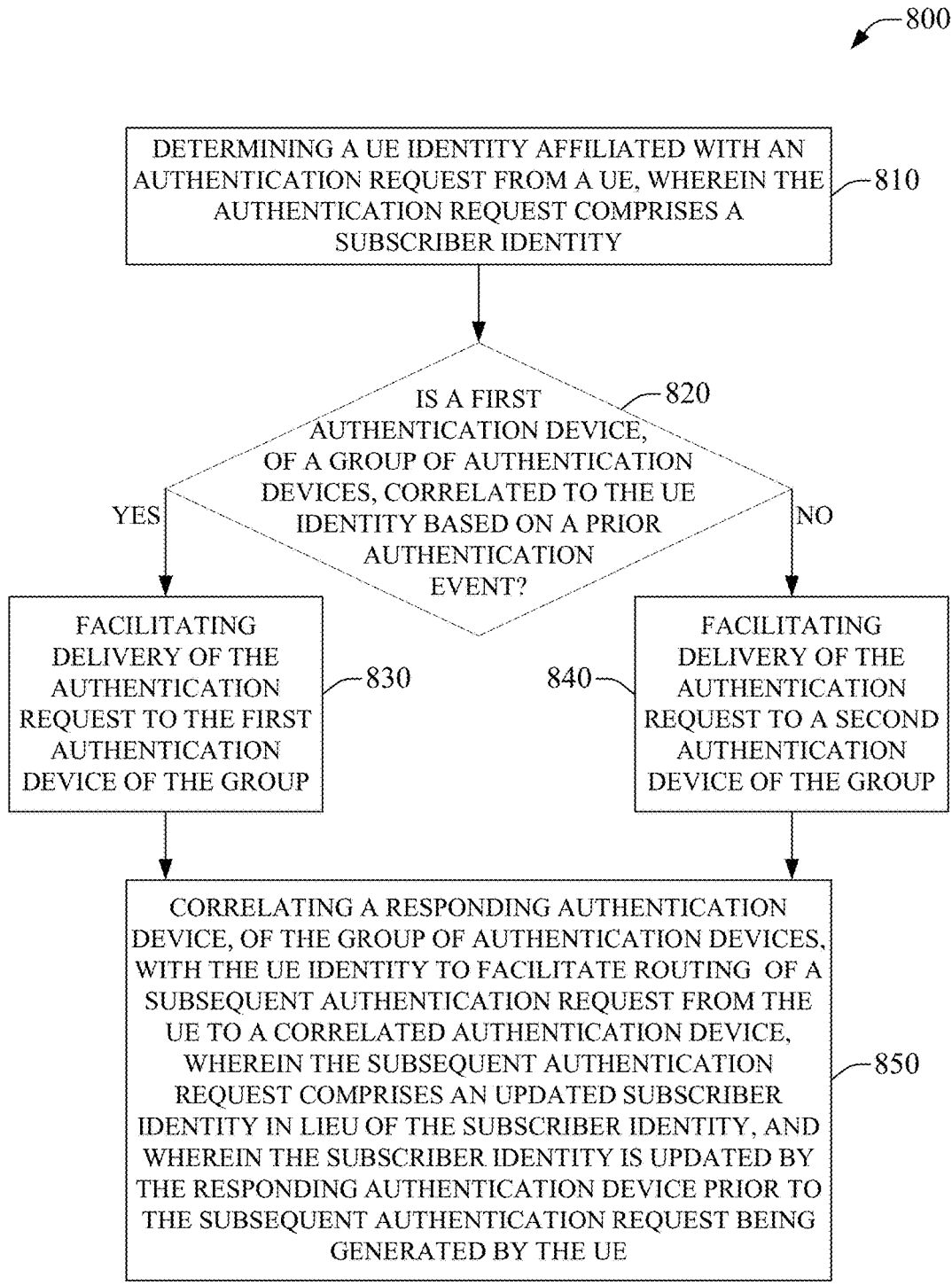
FIG. 8 illustrates an example method enabling selection of an authentication device and updating of a temporary subscriber identity, in accordance with aspects of the subject disclosure.

FIG. 8 illustrates example method 800 enabling selection of an authentication device and updating of a temporary subscriber identity, in accordance with aspects of the subject disclosure. Method 800, at 810, can comprise determining a UE identity affiliated with an authentication request from a UE. The authentication request can comprise a subscriber identity. It will be noted that the UE identity and the subscriber identity are different. The UE identity identifies a UE device, while the subscriber identity identifies, for example, a subscriber affiliated with the UE. As an example, a laptop can comprise a network access card. The network access card of the laptop can have both a radio MAC address and an associated subscriber identity, whereby an authentication request can therefore comprise both the radio MAC address and the subscriber identity. The radio MAC address of the network access card can be correlated to an authentication device employed to authenticate the subscriber identity of the network access card. As such, the radio MAC address can be employed to route a future authentication request to the same authentication device because the authentication device can be presumed to have record of the subscriber identity as can have been updated by the authentication device.

At 820 it can be determined if a first authentication device of a group of authentication devices is correlated to the UE identity. The correlation can be based on a prior authentication event. Where an authentication device has previously performed an authentication of a subscriber identity with a UE having the UE identity, it can be presumed that the authentication device will have record of the subscriber identity, e.g., an IMSI, a temporary subscriber identity, a pseudonym, etc. As such, the historical authentication event can be used to correlate the authentication server and the UE identity as a construct for identifying an authentication device that can likely have record of the subscriber identity from among a pool of authentication devices, e.g., where the subscriber identity is updated at each authentication event, the last authentication device can be expected to have record of the last update to the subscriber identity value.

Method 800 can proceed to block 830 where the first authentication device of a group of authentication devices is determined to be correlated to the UE identity at 820. At 830, method 800 can comprise facilitating delivery of the authentication request from 810 to the first authentication device of the group of authentication devices. Furthermore, method 800 can proceed to block 840 where the first authentication device of a group of authentication devices is not determined to be correlated to the UE identity at 820. At 840, method 800 can comprise facilitating delivery of the authentication request from 810 to a second authentication device of the group of authentication devices. In an aspect, the second authentication device can be the same as the first authentication device, e.g., at 840, the authentication request can be steered to any authentication device of the group of authentication devices because none of them can have been correlated to the UE identity and, as such, each authentication device of the group is likely to request and IMSI to authenticate, and then will issue an updated subscriber identity that can result in correlation of the responding authentication server to the UE identity from 810.

At 850, method 800 can comprise correlating a responding authentication device, of the group of authentication devices, with the UE identity. At this point method 800 can end. The correlation can facilitate routing of a subsequent authentication request from the UE to a correlated authentication device. The subsequent authentication request can comprise an updated subscriber identity in lieu of the subscriber identity. The subscriber identity can have been updated by the responding authentication device prior to the subsequent authentication request being generated by the UE. Where method 800 proceeds to block 850 from block 830, the responding server can have updated a previously updated subscriber identity. This can result in the responding authentication device having record of the updated subscriber identity prior to using the UE identity to steer a subsequent authentication request from the UE to the responding authentication device. Where method 800 proceeds to block 850 from block 840, the responding authentication device can have updated a true subscriber identity, e.g., an IMSI to a temporary subscriber identity. This is again can result in the responding authentication device having record of the updated, e.g., temporary, subscriber identity, prior to employing the affiliated UE identity to steer a subsequent authentication request from the UE to the responding authentication server.

Figure 9:
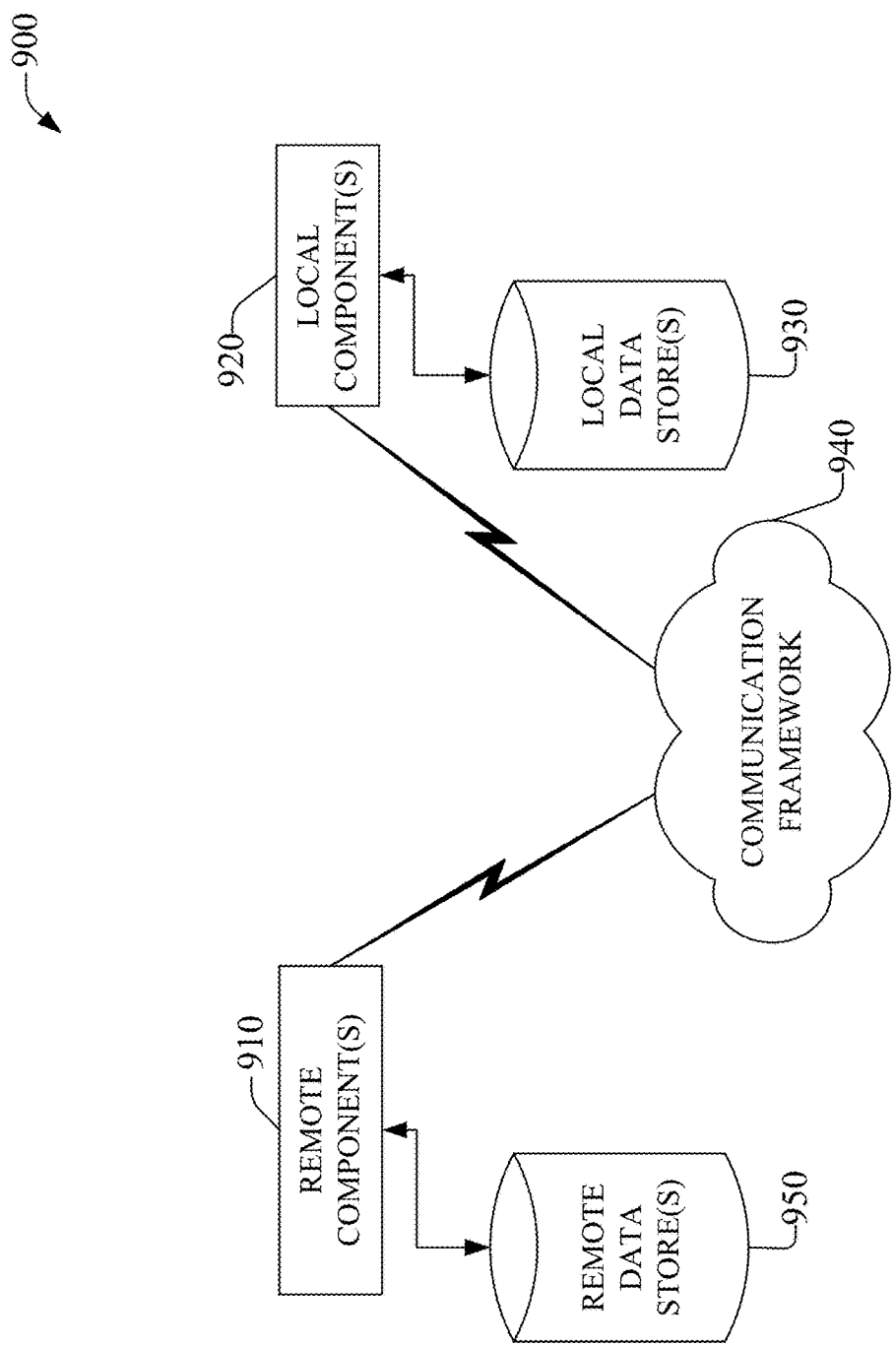
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be core-network devices associated with a network provider identity, e.g., carrier web services core components 470, carrier VPN core components 480, carrier mobility core components 490, etc., internet devices, e.g., devices comprising internet 460, etc., network edge devices, e.g., AP 403, RAN 404, etc., UEs, e.g., UE 402, etc., or any other device that is located remotely from an ARDD, e.g., ARDD 110, 210, 310, 410, etc.

The system 900 also comprises one or more local component(s) 920. The local component(s) 920 can be hardware and/or software (e.g., threads, processes, computing devices). In some embodiments, local component(s) 920 can comprise ARDD 110, 210, 310, 410, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, correlations between UE identities and authentication devices, etc., can be stored on remote data storage device 324, on local data storage device 322, etc., that can be coupled to a ARDD 110, 210, 310, 410, etc.

Figure 10:
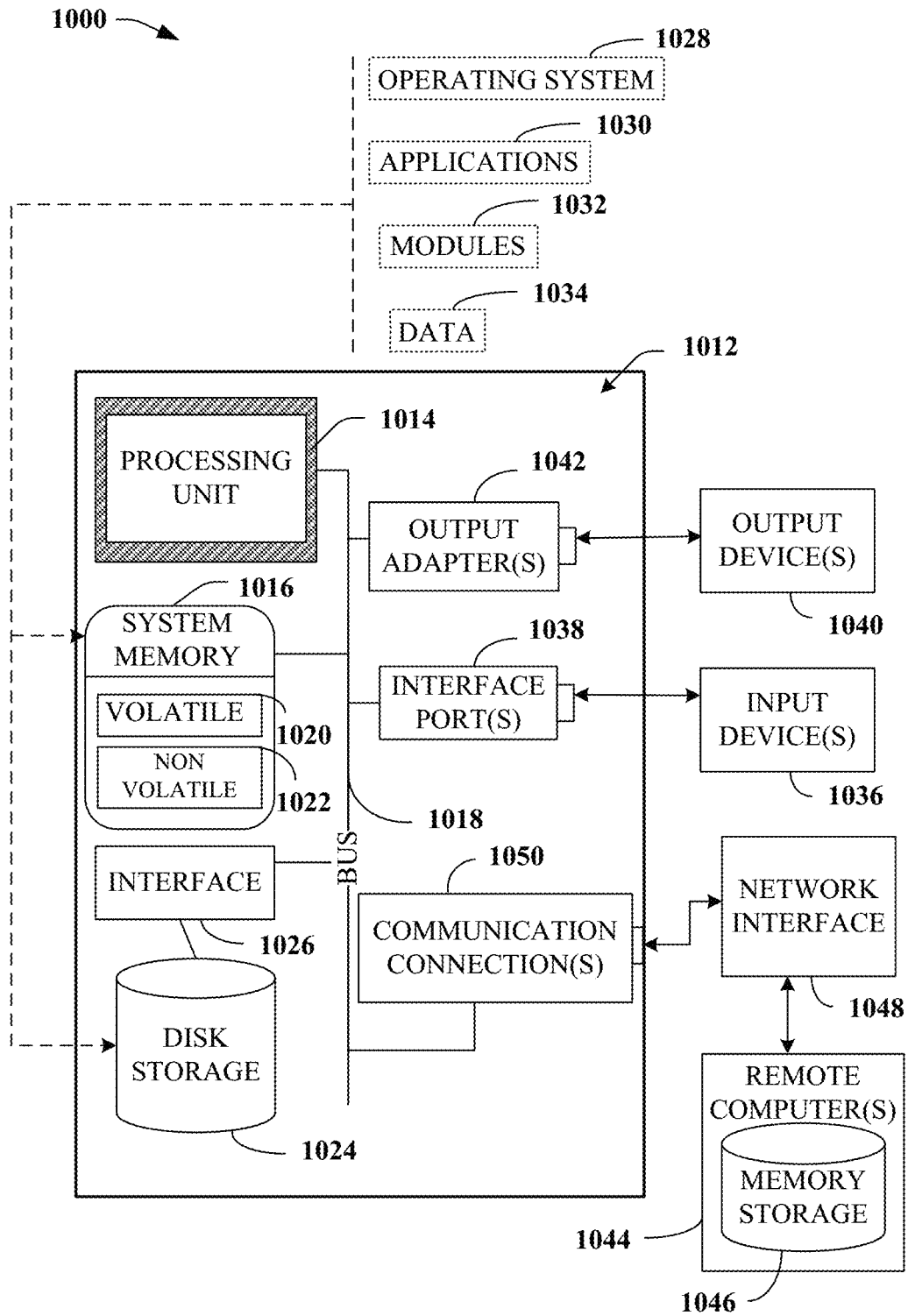
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in ARDD 110, 210, 310, 410, etc., UE 402, etc., DEA 406, etc., core-network components, e.g., 470, 480, 490, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising receiving, by ARDD 110, 210, 310, 410, etc., an authentication request comprising a UE identity, and routing the authentication request to an authentication device, wherein the authentication device is selected based on a previous authentication event between the user equipment and the authentication device, wherein the routing the authentication request to the selected authentication device enables use of temporary subscriber identities, e.g., pseudonyms, updateable subscriber identities, etc., that facilitate improved security in the authentication process.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A network device, comprising:
a processor; and
a memory that stores executable instructions that, when executed by the processor, facilitate performance of operations, comprising:
receiving an authentication request from a user equipment associated with a subscriber identity, wherein the authentication request seeks to authenticate the subscriber identity to a service capable of being provided by network devices of a network, and wherein the authentication request comprises:
a hardware identifier affiliated with the user equipment,
a subscriber identifier affiliated with the subscriber identity, and
a payload;
based on the hardware identifier, facilitating routing of the authentication request to an authentication device of the network;
receiving an authentication response comprising an updated subscriber identifier to facilitate updating the subscriber identifier at the user equipment from the authentication device; and
facilitating routing of the authentication response to the user equipment, such that a subsequent authentication request received by the network device from the user equipment comprises the hardware identifier affiliated with the user equipment and the updated subscriber identifier affiliated with the subscriber identity.

2. The network device of claim 1, wherein the authentication device is previously associated with the hardware identifier based on a prior occurrence of an authentication event.

3. The network device of claim 2, wherein the subscriber identifier is an updateable subscriber identifier.

4. The network device of claim 1, wherein the authentication device is not previously associated with the hardware identifier.

5. The network device of claim 4, wherein the subscriber identifier is an international mobile subscriber identity identifier.

6. The network device of claim 4, wherein the subscriber identifier is an updateable subscriber identifier.

7. The network device of claim 1, wherein the hardware identifier is a media access control identifier.

8. The network device of claim 1, wherein the subscriber identifier is a pseudonym identity in accord with an extensible authentication protocol-authentication and key agreement process.

9. The network device of claim 1, wherein the the receiving the authentication response from the authentication device is in response to an authentication being performed by the authentication device pursuant to the authentication request.

10. The network device of claim 9, wherein the payload is a first payload, and wherein the subsequent authentication request received by the network device from the user equipment further comprises a second payload different than the first payload.

11. A method, comprising:
receiving, by a system comprising a processor, an authentication request comprising:
a hardware identifier affiliated with a user equipment to be authenticated,
a subscriber identifier affiliated with a subscriber identity associated with the user equipment, and
a payload;
facilitating, by the system, routing of the authentication request to an authentication device based on a correlation between the hardware identifier and the authentication device, wherein, in response to a previous authentication event being determined to have taken place between the user equipment and the authentication device, the correlation is made based on a result of the previous authentication event;
receiving, by the system, an authentication response comprising an updated subscriber identifier to facilitate updating the subscriber identifier at the user equipment from the authentication device; and
facilitating, by the system, routing of the authentication response to the user equipment, such that a subsequent authentication request received by the system from the user equipment comprises the hardware identifier affiliated with the user equipment and the updated subscriber identifier affiliated with the subscriber identity.

12. The method of claim 11, wherein, in response to the previous authentication event being determined not to have taken place between the user equipment and any authentication device of the network, the facilitating the routing is based on the correlation being an undefined correlation between the hardware identifier and the authentication device.

13. The method of claim 11, wherein the facilitating the routing is based on the correlation being a failed correlation between the hardware identifier and the authentication device resulting from the authentication device not comprising a record of the subscriber identity despite the previous authentication event between the user equipment and the authentication device having been determined to have taken place.

14. The method of claim 11, wherein the receiving the authentication response from the authentication device in response to an authentication being performed based on the authentication request.

15. The method of claim 14, wherein the receiving the authentication response comprises receiving an international mobile subscriber identity as the subscriber identifier.

16. The method of claim 11, wherein the receiving the authentication request comprises receiving a radio media access controller identity for the hardware identifier.

17. A non-transitory machine-readable storage medium, comprising executable instructions that, when executed by a processor, facilitate performance of operations, comprising:
receiving a first instance of a hardware identifier affiliated with a user equipment;
receiving an updateable subscriber identifier affiliated with a subscriber identity; and
receiving a first payload;
determining a first authentication device based on a first correlation between the hardware identifier and the first authentication device;
communicating the updateable subscriber identifier and the first payload to the first authentication device;

updating the updateable subscriber identifier at the user equipment based on a first authentication response received from first the authentication device, wherein the first authentication response comprises the first updated subscriber identifier which is employed in the updating the updateable subscriber identifier, and wherein a subsequent authentication request from the user equipment is to comprise the hardware identifier affiliated with the user equipment and the first updated subscriber identifier.

18. The non-transitory machine-readable storage medium of claim 17, wherein the updateable subscriber identifier is generated in response to an occurrence of an authentication event.

19. The non-transitory machine-readable storage medium of claim 17, wherein the hardware identifier is a radio media access controller identity, and wherein the updateable subscriber identifier is an international mobile subscriber identity.

20. The non-transitory machine-readable storage medium of claim 17, wherein the operations further comprise:
receiving a second instance of the hardware identifier;
receiving the first updated subscriber identifier;
receiving a second payload;
communicating the first updated subscriber identifier and the second payload to a second authentication device based on a second correlation between the hardware identifier and the second authentication device;
receiving a second authentication response from the second authentication device in response to the subsequent authentication request, wherein the second authentication response comprises a second updated subscriber identifier; and
facilitating routing of the second authentication response to the user equipment, wherein the second updated subscriber identifier enables the first updated subscriber identifier to be updated to the second updated subscriber identifier at the user equipment.

* * * * *